(12) United States Patent
Washio et al.

(10) Patent No.: US 6,301,022 B1
(45) Date of Patent: Oct. 9, 2001

(54) CORRECTION METHOD OF DOCUMENT INCLINATION ANGLE

(75) Inventors: Koji Washio; Yoshiyuki Ichihara, both of Hachioji (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/049,846

(22) Filed: Mar. 27, 1998

(30) Foreign Application Priority Data

Apr. 2, 1997 (JP) .................................................. 9-083794
May 28, 1997 (JP) .................................................. 9-138402

(51) Int. Cl.⁷ ...................................................... H04N 1/04
(52) U.S. Cl. ........................................... 358/488; 358/496
(58) Field of Search .................................... 382/277, 296; 358/488, 496, 474

(56) References Cited

U.S. PATENT DOCUMENTS

| | | | |
|---|---|---|---|
| 4,618,991 | * 10/1986 | Tabata et al. | 382/277 |
| 4,687,944 | 8/1987 | Mitsuka et al. | 358/474 |
| 4,759,076 | * 7/1988 | Tanaka et al. | 382/277 |
| 4,802,229 | 1/1989 | Yamada | 382/289 |
| 4,953,230 | 8/1990 | Kurosu | 382/290 |
| 4,975,977 | 12/1990 | Kurosu et al. | 382/277 |
| 5,149,977 | 9/1992 | Mita | 250/556 |
| 5,181,260 | 1/1993 | Kurosu et al. | 382/289 |
| 5,191,438 | * 3/1993 | Katsurada et al. | 358/426 |

FOREIGN PATENT DOCUMENTS

| | | |
|---|---|---|
| 0432723 | 6/1991 | (EP) . |
| 61203781 | 9/1986 | (JP) . |
| 8192939 | 7/1996 | (JP) . |
| 95 12271 | 5/1995 | (WO) . |

OTHER PUBLICATIONS

European Search Report EP 98 10 5835.
Patent Abstracts of Japan, Publication #08192939, Publication Abstracts of Japan, Publication date Jul. 30, 1996 (1 page).
Patent Abstracts of Japan, Publication #61203781, Publication date: Sep. 9, 1986.

* cited by examiner

Primary Examiner—Cheukfan Lee
(74) Attorney, Agent, or Firm—Jordan B. Bierman; Bierman, Muserlian and Lucas

(57) ABSTRACT

A correction method of a document inclination angle includes the steps of: first detecting an edge of a document; second detecting an inclination amount of the document corresponding to an inclination angle according to a detected result of the edge of the document. The inclination angle represents an inclination angle of the edge of the document with respect to a first reference direction and a second reference direction perpendicular to the first reference direction. The correction method further includes correcting the inclination angle of image data of the document with respect to the first and second reference directions. The step of the correcting includes a shift processing conducting a first shift processing in which the image data are shifted to one of the first and second reference directions according to the inclination amount and conducting a second shift processing in which the image data are shifted to the other of the first and second reference directions according to the inclination amount.

16 Claims, 13 Drawing Sheets

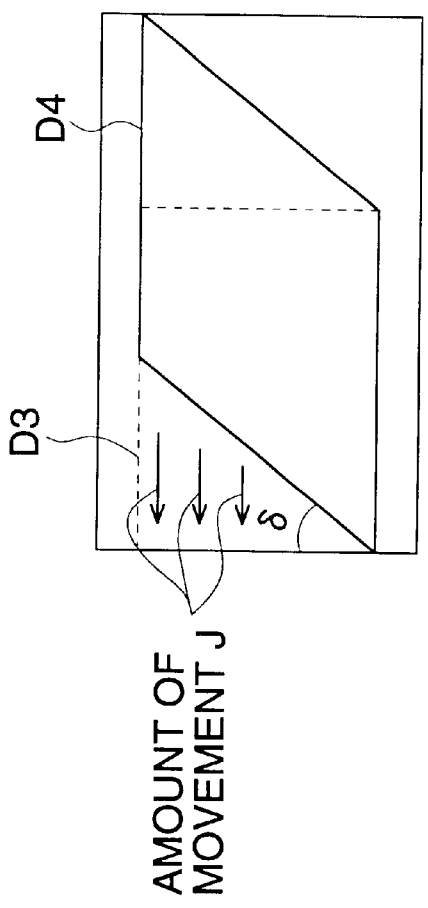
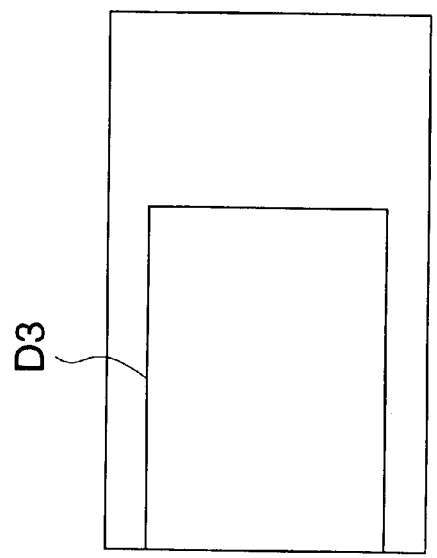
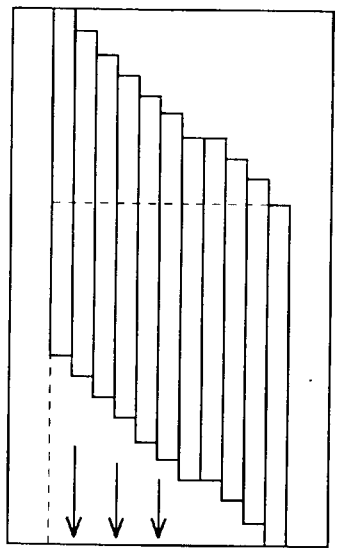
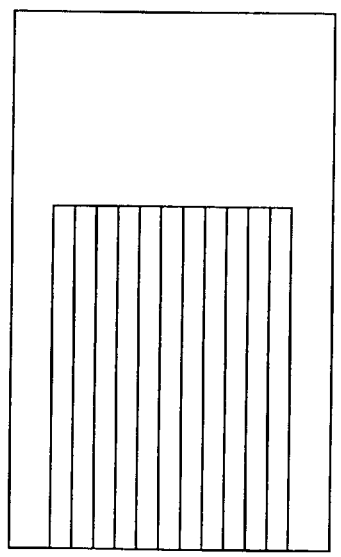

IMAGE DATA AREA (BEFORE MAGNIFICATION CHANGE)

IMAGE DATA AREA (AFTER MAGNIFICATION CHANGE)

AMOUNT OF MOVEMENT I

FIG. 13 (a)
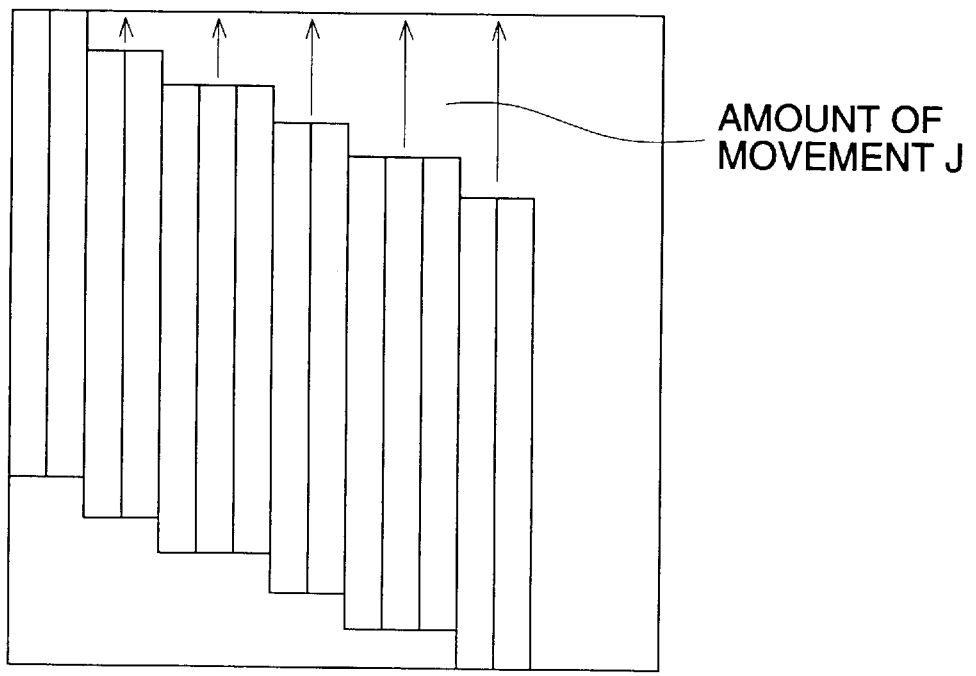
AMOUNT OF MOVEMENT J
FIG. 13 (b)
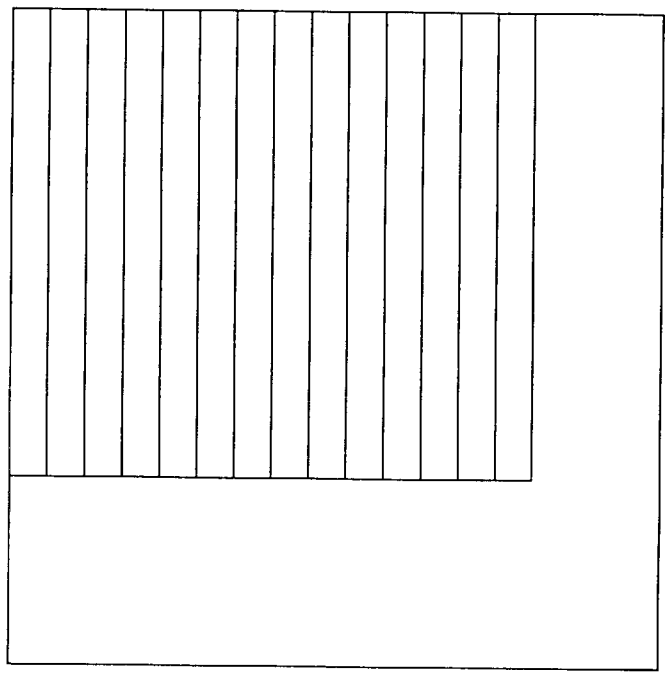

CORRECTION METHOD OF DOCUMENT INCLINATION ANGLE

BACKGROUND OF THE INVENTION

The present invention relates to a correction method of document inclination angle for an image reading apparatus such as a scanner, facsimile device, digital copier in which a document is placed on an image reading position, and an image of the document is read, and specifically to an image reading apparatus in which, even when the placed document is inclined, it can be corrected.

In an image reading apparatus such as a scanner, facsimile device, digital copier in which a document is placed on an image reading position, and an image of the document is read, there is a case in which the document is placed while being inclined. When the inclined document is read, for example, copied (image formation), as it is, there is a possibility that some portions of the image are lost.

Accordingly, in the conventional image reading apparatus, an inclination angle of the document is detected by detecting an inclination of a row of characters from image information obtained from the inclined document, and the inclination angle is corrected corresponding to obtained image information.

In the above method, in order to detect the inclination angle of the document, it is necessary that image information is read (pre-scanned) after the document is previously set on a reading position. Therefore, a long period of time is necessary for detecting the inclination angle, and thereby, image reading efficiency is lowered. Further, in order to detect the inclination of a character row, it takes a long time because complicated calculation is necessary, and further, cost is increased because many memories are used for calculation.

SUMMARY OF THE INVENTION

An object of the present invention is to shorten a time necessary for detecting the inclination angle of the document, and to increase the efficiency of image reading. Further, another object of the present invention is to shorten a time necessary for inclination angle correction, and to reduce a cost.

The above objects can be attained by the following structure.

In the structure, a correction method of the document inclination angle has the following steps: the first detection step to detect an edge of the document; the second detection step to find an inclination value corresponding to the inclination ($\theta$) of the document based on the detected document edge information, wherein the inclination of the document is the inclination of the document with respect to the first direction (X direction), which is the reference, and the second direction (Y direction) perpendicular to the first direction, and a correction step to correct the inclination with respect to the first direction and the second direction of the image data, wherein the correction step comprises the following processing: the first shift processing to shift the image data to one direction of the first direction and the second direction corresponding to the inclination value; and the second shift processing to shift the image data to another direction of the first direction and the second direction corresponding to the inclination value.

BRIEF DESCRIPTION OF THE DRAWINGS

FIGS. 6(a), 6(b), 6(c) and 6(d) are views typically showing a horizontal correction respectively.

FIGS. 13(a) and 13(b) are illustrations showing data movement in the data shift processing in the example of the present invention.

DETAILED DESCRIPTION OF THE PREFERRED EMBODIMENT

Figure 1:
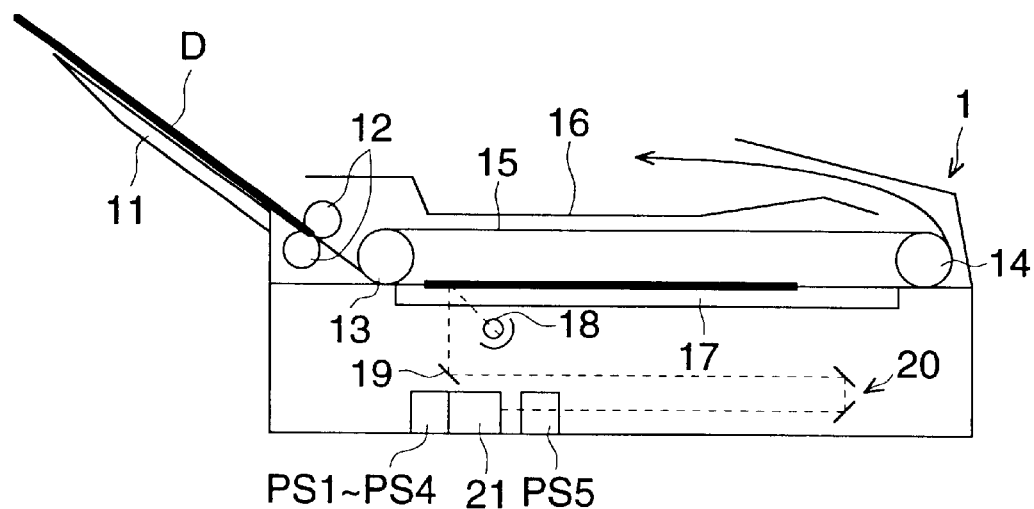
FIG. 1(a) is a outline sectional view of an image reading apparatus.
FIG. 1(b) is a outline plan view, viewed from the upper surface side of a platen of the image reading apparatus.
Figure 1:
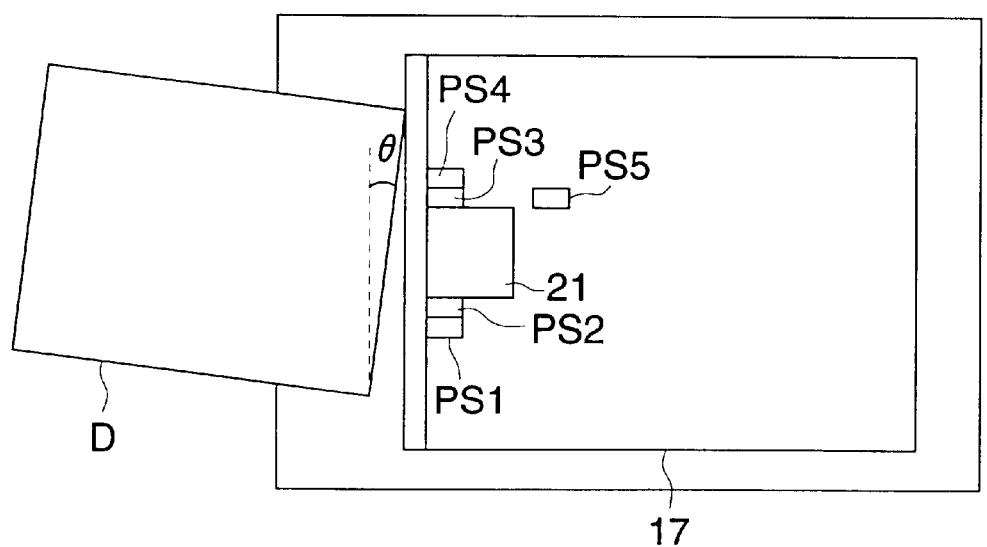

Referring to drawings, an example of the present invention will be described below. FIG. 1(a) is an outline sectional view of an image reading apparatus and FIG. 1(b) is an outline view viewed from the upper surface side of a platen of the image reading apparatus 1.

Initially, an outline of the image reading apparatus 1 will be described below. A document stacking table 11 is a means to place a document D to be read thereon. A conveying means is a means to convey the document placed on the document stacking table 11 to an image reading position, which will be described later, and in the present example, the conveying means has a feeding roller pair 12 and a conveyance belt 15 trained around a roller pair 13 and 14. The feeding roller pair 12 is a means to separate a document sheet from the document D placed on the document stacking table 11, and to send it. The conveyance belt 15 is a means to convey the document D, fed by the feeding roller pair 12, to the image reading position while the document D is being nipped between the belt 15 and the platen 17. The image reading position is a position to read the document D conveyed by the conveying means, and in the present example, because the image reading apparatus 1 reads the document D by a scanning optical system under the condition that the document D is topped, the image reading position is a predetermined position on the light transmissive platen 17. In this connection, in the present example, the image is read under the condition that the document D is stopped, however the image reading apparatus may read the document D while the document D is moved. In the image reading apparatus 1 of the present example, the document D is conveyed based on the center reference, (the center of the document conveyed by the conveying means coincides with the center line (the secondary scanning direction) of the platen 17). In this case, in the system in which the reference is an edge of the platen, when the document is inclined, at least one angle portion of an image of the document D can not be read by an image reading means 21, which will be described later.

A light source 18 is a means to emit light onto the document D, which is conveyed to the image reading position on the platen 17 and stopped, and is a linear light source extending in the primary scanning direction (in FIG. 1, the direction perpendicular to the paper). The first mirror 19 and a V mirror 20 are means to guide the light, emitted from the light source 18 and reflected by the document D, to a succeeding image reading means 21. When the image of the document D is read, the light source 18 and the first mirror are integrally moved in the secondary scanning direction (the left and right direction in FIG. 1) perpendicular to the primary scanning direction, and the V mirror 20 is moved at a ½ moving speed of the light source 18 and the first mirror. In this connection, although not shown in the drawing, an image forming means to form an light image of the document D onto the image reading means 21 is arranged between the V mirror 20 and the image reading means 21.

The image reading means 21 is a means to read the image of the document D, and is a photoelectric conversion element to photo-electrically convert the light reflected from the document D for each pixel. In the present example, the image reading means 21 is structured by a line sensor(line CCD) extending in the primary scanning direction. The image reading means 21 reads the document image for each line, and can read an image on the entire surface of the document D stopped at the image reading position when the light source 18, the first mirror 19 and the V mirror 20 are moved in the secondary scanning direction. The read document image is converted into a digital image signal, and is sent to the outside such as an image forming apparatus. The light source 18, the first mirror 19, the v mirror 20, the image reading means 21, etc., are called a scanner.

The document D in which the image on the entire surface is read by the image reading means 21, is conveyed by the conveyance belt 15, and is delivered onto a sheet delivery table 16 by a sheet delivery roller, not shown in the drawing.

In such the image reading apparatus 1, when the document D placed on the document stacking table 11 is conveyed to the image reading position by the conveying means, sometimes the conveying condition is different in the widthwise direction of the document D (the direction perpendicular to the conveyance direction of the document D, and in the present example, parallel to the primary scanning direction), due to a condition of the conveying means, the quality of paper of the document D, etc. Therefore, sometimes the document D is conveyed with inclination (refer to FIG. 1(b)), thereby, the document D is not stopped at a predetermined image reading position in a right angle. Accordingly, in the present example, the inclination angle of the document is detected by an inclination angle detecting means 22, and the image read by the image reading means 21 is corrected by the correcting means according to the inclination angle θ. Hereinafter, this structure will be explained.

Initially, the detection of the inclination angle θ by the inclination angle detecting means, will be explained below,
referring to FIGS. 1(a), 1(b), FIG. 2 which is a view showing the result of the detection by the photo-sensors PS1 to PS5, and FIG. 3 which is a functional block diagram of the inclination correction.

Below the platen 17, 4 photo-sensors PS1 to PS4, which are the document detecting means, are arranged on a straight line in the direction (the primary scanning direction) perpendicular to the document conveyance direction (in the present example, the secondary scanning direction) by the conveying means. When the photo-sensors PS1 to PS4 are arranged by standing side by side with the image reading means 21, a free space in the primary scanning direction of the image reading means 21 can be efficiently utilized. A photo-sensor PS5, which is the document detecting means, is arranged with respect to the photo-sensor PS3, on the downstream side of the conveyance direction (the secondary scanning direction) by the conveying means. These photo-sensors PS1 to PS5 are means to detect an edge of the document (which is an edge portion in the conveyance direction, and in the present example, a leading edge portion in the conveyance direction) conveyed by the conveying means.

In the present example, when photo-sensors PS2, PS3 and PS5 are arranged in such a manner that a distance between photo-sensors PS2 and PS3 and a distance between photo-sensors PS3 and PS5 are equal, a calculation of the inclination angle θ is simplified, and cost reduction by an increase of the calculation speed and simplification of the circuit is realized. Further, when the document is detected by the photo-sensors PS1 to PS5, the light source 18 and the first mirror 19 are moved to a position not to interfere with the detection, or are structured not to interfere with the detection. Further, to make the detection by the photo-sensors PS1 to PS5 easy, it is preferable that the entire surface (or partial surface) of the conveying belt 15 has a density different from the background (white), for example, black.

Figure 2:
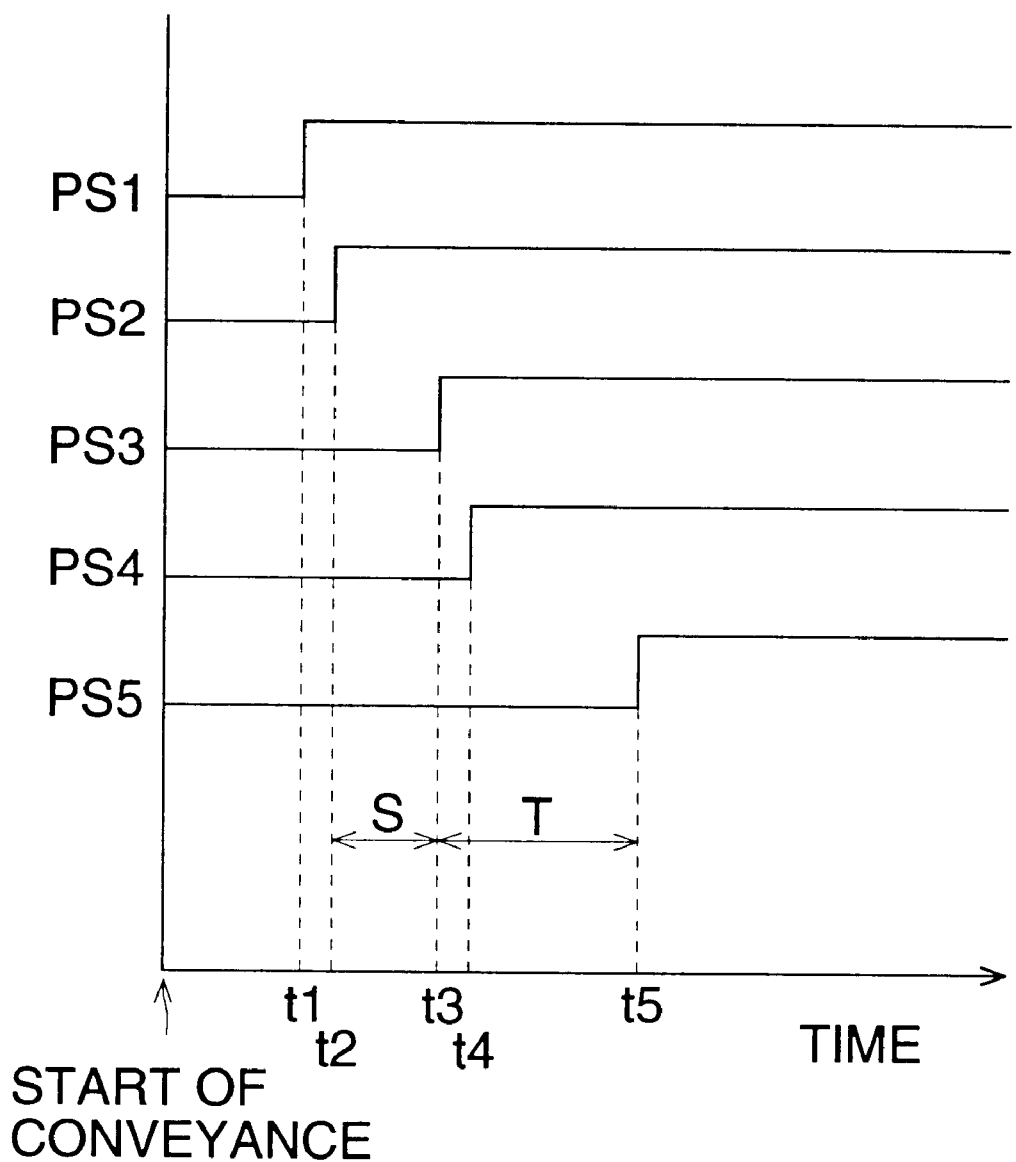
FIG. 2 is a view showing a detection result of photo-sensors PS1 to PS5.
Figure 3:
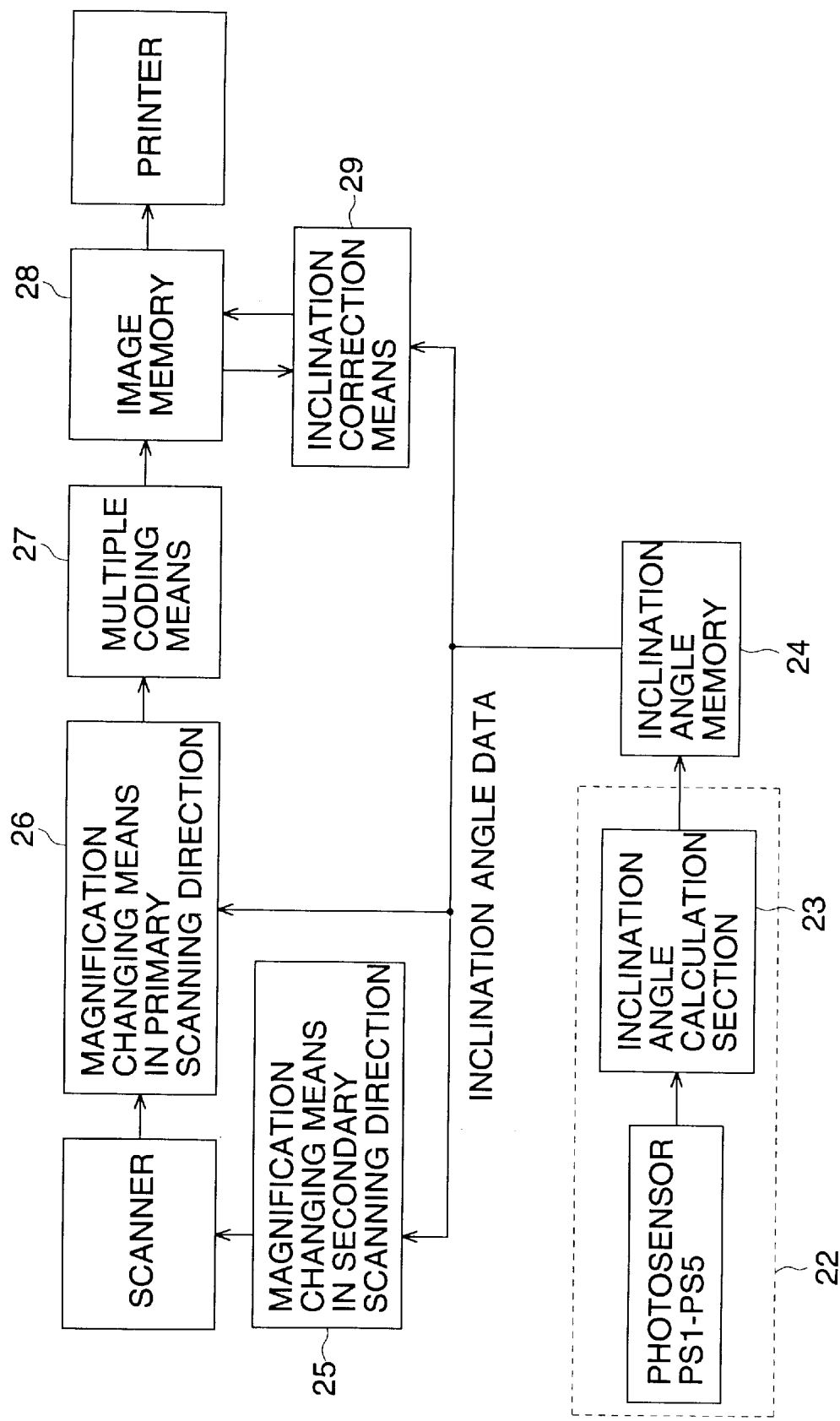
FIG. 3 is a functional block diagram of inclination correction.

When the leading edge of the document D is detected by photo-sensors PS 1 to PS 5, while the document D is conveyed to the image reading position by the conveying means, the output signal is as shown in FIG. 2, and the leading edge of the document D is detected with time difference as shown by time t1 to t5. Herein, the inclination angle ζ of the document D is detected by the output signals of the photo-sensors PS2 and PD3. That is, the inclination angle θ of the document D is detected by utilizing that the difference s of timing between the output signals of the photo-sensors PS2 and PS3 depends on the inclination angle θ of the document D. Further, in the present example, in order to detect the inclination angle θ more correctly, the conveyance speed of the document D is detected by the difference T of timing between the output signals of photo-sensors PS3 and PS5. However, because the conveying means is structured so as to convey the document D at a predetermined conveyance speed, this predetermined conveyance speed may be used instead of the above conveyance speed. In this connection, the differences s and T of timing are measured by a timer, or the like, which is a time measurement means, not shown in the drawings.

The output signals from photo-sensors PS2, PS3, and PS5 are sent to the inclination angle calculating section 23, and the inclination angle θ of the document is calculated thereby. That is, the inclination angle θ of the document is obtained by calculating the following equation.

$$\theta = \mathrm{Tan}^{-1}(s/T)$$

The obtained inclination angle θ is stored in a inclination angle memory 24, which is an inclination angle storing means to store the inclination angle θ.

In order to realize the relationship of the above equation, the same one side of the document D conveyed by the conveying means needs to pass the photo-sensors PS2, PS3 and PS5. The reason is as follows: when an angle of the document D passes between photo-sensors PS2 and PS3, the inclination angle θ can not be detected by only these signals, and an accurate correction of the inclination angle can not be conducted. Therefore, in the present example, photo-sensors PS1 and PS4 are arranged outside the photo-sensors PS2 and PS3. According to the output signals of photo-sensors PS1 to PS4, it is detected whether one side of the document D passes the photo-sensors PS2, PS3, and PS4. That is, it is detected by calculation in the inclination angle calculating section 23 whether the condition of the equation t1−t2=t3−t4 is satisfied or not, (it is not necessary that the both sides are completely equal, but the both sides may have at least the same sign). When this condition is not satisfied, the detection of the inclination angle θ is erroneous, and a display (message) that conveyance of the document D is failed, is displayed on a liquid crystal display (display means), not shown, provided on an operation panel, not shown, and the image reading operation is stopped for a time.

As described above, in the present example, the inclination angle θ of the document is detected as follows: the document D, which is being conveyed, is detected while the document is conveyed on the conveyance path by the conveying means, and based on the result, the inclination of the document D is detected. Due to this, no pre-scanning is necessary for detecting the inclination angle θ of the document, a time necessary for detecting the inclination angle of the document can be shortened, and the image reading efficiency can be increased. Further, in the present example, in order to detect the document D, a plurality of photo-sensors PS2 and PS3 are arranged in the direction perpendicular to the conveyance direction of the document D, thereby, the inclination angle θ of the document D can be detected by a simple structure, and not only cost reduction, but also an increase of the detection efficiency of the inclination angle θ can be intended. Further, when the photo-sensor PS5 is arranged in the conveyance direction of the document D with respect to the photo-sensor PS3, the practical conveyance speed of the document D can also be accurately detected, and thereby, the inclination angle θ of the document D can be accurately detected.

In the present example, the photo-sensors PS1 to PS5 are provided below the platen 17, thereby, a space can be efficiently utilized, and the inclination angle θ can be accurately detected when the inclination angle θ of the document D is calculated at a position near the image reading position. However, it is not limited to the above description, but the photo-sensors may be provided on the conveyance path of the document by the conveying means such as an above position of the platen 17, or a position between the feeding roller pair 12 and the conveyance belt 15. Further, in the present example, the leading edge of the document D is detected by the photo-sensors PS1 to PS5, however, the trailing edge may be detected. In the present example, the document D is detected by the photo-sensors PS1 to PS5, however, other non-contact type switch or contact type switch may be used, and the essential point is that it may be a mean by which the document D conveyed by the conveying means can be detected. Further, the light source 18 and the first mirror 19 are not moved to a position at which these units do not interfere with the detection, or are not structured so that these units do not interfere with the detection, but the light source 18 is turned on while the document D is conveyed by the conveying means, and the document D may be detected by using the image reading means 21.

Next, correction of the image, read by the image reading means 21 according to the obtained inclination angle θ, will be described.

Generally, affine transformation is known as a method to correct the image read at the inclination angle θ. In the affine transformation, 2×2 matrix calculation is conducted, and therefore, the memory capacity needs to be large. Accordingly, in the present example, the image correction by data shift processing is conducted which has been proposed in Japanese Patent Application Open to Public Inspection No. 83794/1997 by the inventors, and in which an amount of calculation and the memory are more economical. The data shift processing shifts image information for each pixel stored in the image memory 28, which is an image storing means, as the lengthwise correction or the widthwise correction, and thereby, conducts image correction. In this connection, when the image is corrected by the data shift processing, the magnification ratio of the document or the aspect ratio is changed, therefore, independent lengthwise/widthwise magnification change processing is preferably conducted.

In this connection, generally, in the data shift processing and the magnification change processing, it is more easily considered that the magnification change processing is conducted after the data shift processing, because the image whose aspect ratio is disordered by the data shift processing, can be returned to cope with the original magnification. In contrast to this, when the data shift processing is conducted after the magnification change processing, the disorder of the aspect ratio caused by the data shift processing needs to be previously presumed, and the inclination angle of the read image is distorted by the magnification change processing, and its correction processing becomes complicated. However, in the image reading apparatus to read the document image by the relative movement to the document (in more detail, it is scanned by the scanning optical system) as in the present example, the magnification change in the secondary scanning direction (widthwise) can be easily conducted by changing the relative movement speed (in more detail, the moving speed of the light source 18, the first mirror 19, and the V mirror 20), and further, deterioration of the image quality by the magnification change can be prevented. Therefore, in the present example, by conducting the data shift processing after the magnification change processing, the image read at the inclination angle θ is corrected.

Initially, the magnification change processing will be described below, referring to FIGS. 3, and FIGS. 4(a), 4(b) and 4(c), which are views expressing the inclined documents on the platen 17. FIG. 4(a) is an outline view expressing the inclined document on the platen 17, FIG. 4(b) is a conceptual view showing an image D1 to be read, and FIG. 4(c) is a conceptual view showing image data after magnification change processing. As the magnification change processing, the following processing is conducted:

Width (the secondary scanning direction): 1/cos θ times,
Length (the primary scanning direction): cos θ times.

In more concrete explanation, as described above, the inclination angle θ of the document D is detected during conveyance of the document D by the conveying means, and the inclination angle is inputted into an inclination angle memory 24. At the time, the document D is inclined as shown in FIG. 4(a), and placed on the platen 17. Data of the inclination angle θ stored in the inclination angle memory, is initially sent to a secondary scanning magnification change processing means 25. The secondary scanning magnification change processing means 25 is a means to conduct the widthwise (the secondary scanning direction) magnification change by changing the scanning (movement) speed (in the present example, the movement speed of the light source 18, the first mirror 19 and the V mirror 20) in the secondary scanning direction by the scanner, corresponding to the inclination angle θ. That is, in the secondary scanning magnification change processing means, the scanner is controlled so that it scans at the scanning speed of 1/cos θ of the scanning speed at the life-size processing. When the scanner scans the entire surface of the document at the controlled scanning speed (read by the image reading means 21), the image signal is generated which is magnification-changed by 1/cos θ times in the secondary scanning direction.

The generated image signal is successively inputted to the primary scanning magnification change processing means 26, and is subjected to primary scanning magnification change processing (lengthwise magnification change processing). The primary scanning magnification change processing means 26 is a means to conduct primary scanning magnification change processing corresponding to the inclination angle θ stored in the inclination angle memory 24, and the image signal is magnification changed by cos θ times, for example, by the linear interpolation, or the like.

Figure 4:
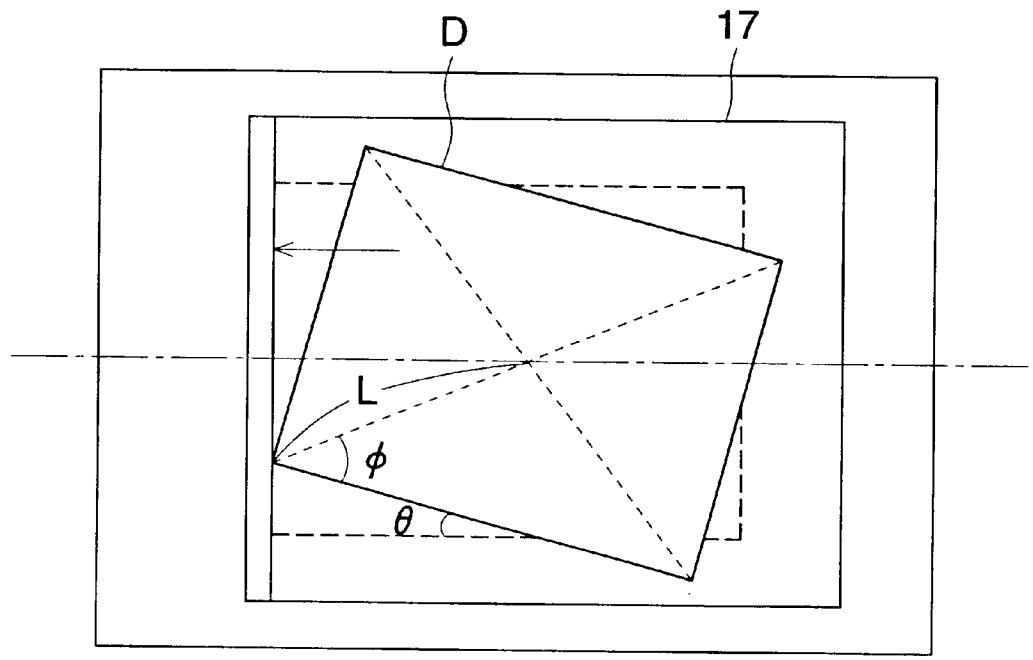
FIGS. 4(a), 4(b) and 4(c) are views respectively expressing a document inclined on the platen.
Figure 4:
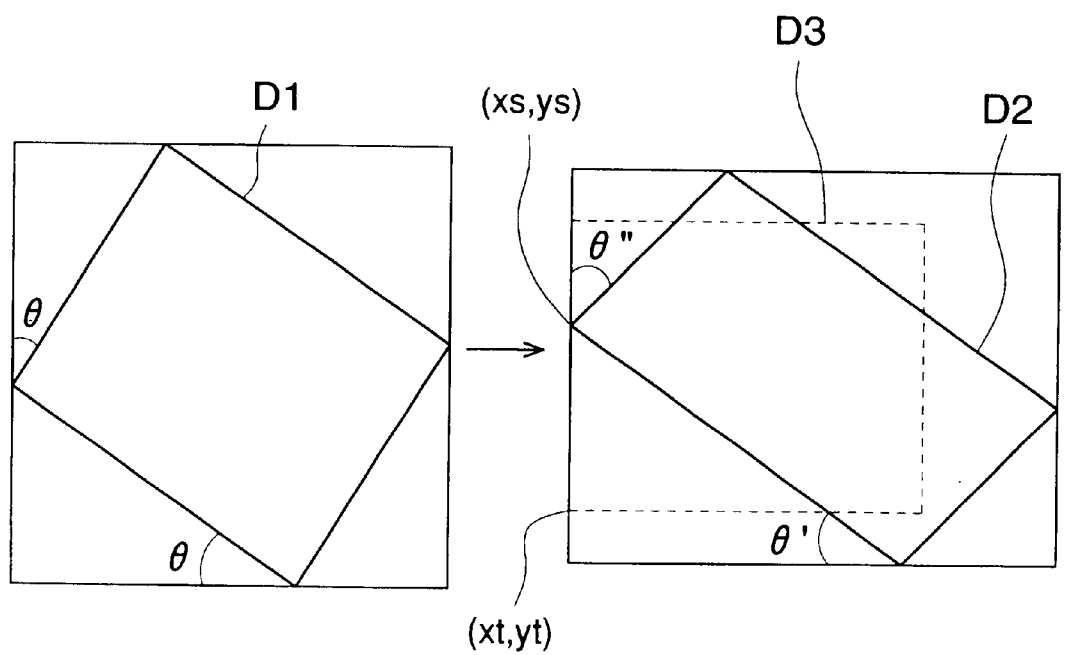

As described above, the shape of the image D1 recorded on the document D on the platen 17, is changed from a rectangular (refer to FIG. 4(*b*)) into a parallelogram (refer to FIG. 4(*c*)), when the image is read and magnification change processed by the image reading means 21. As the shape is changed, the inclination angle is also changed as follows (refer to FIG. 4(*c*)).

Angle from the widthwise (the secondary scanning) direction: $\theta' = \tan^{-1}(\tan\theta \cdot \cos^2\theta)$ Angle from the lengthwise (the primary scanning) direction: $\theta = \tan^{-1}(\tan\theta / \cos^2\theta)$ As described above, the image signal subjected to magnification processing is multiple-coded by a multiple coding processing means 27. As a multiple coding method, it is preferable that the multiple coding method in which an image size is compressed so that the multiple encoding processing can be conducted by a small memory capacity, for example, an error diffusion method or a dither method is used, however, if there is a sufficient memory capacity, the multiple coding processing means may be omitted. The image signal subjected to the multiple coding processing, is stored once in an image memory 28, which is an image storing means to store image data. Then, the image inclination is corrected by data shift processing.

Incidentally, image data outputted from the scanner covers almost the entire area of the platen 17, however, in order to extract an area corresponding to the document D in it (in the case of a copier, to print the image data at the correct position of a predetermined sheet), it is necessary to grasp the correction method about the following: from which portion (the top of the document area after correction) the document area in the image data should begin. For that purpose, before the inclination of the image is corrected, it is necessary to accurately grasp the size of the document D, the document reference point, and the top of the document area after the inclination correction. In this connection, "the document reference point" used above, means an angle portion of the document D which is read at first when the image is read by the image reading means 21. Further, "the top of the document area after correction" means a position corresponding to the top of the document area of the image data after the inclination correction, and as shown in FIG. 4(*c*), the document reference point is expressed as (xs, ys), and the top of the document area after correction is expressed as (xt, yt). Incidentally, in the inclination correction, it is included also to correct so that the document reference point (corner of the document D) is located at the top of the document area after correction. In FIG. 4(*c*), an area shown by a dotted line is an area D3 of the document after inclination correction.

In order to grasp them, an edge portion of the document D is detected from image data stored in the image memory 28, and the size of the document D, the document reference point (xs, ys), and the top of the document area after inclination correction (xt, yt) can be obtained.

However, in order to obtain the size of the document D, the document reference point (xs, ys), and the top of the document area after inclination correction (xt, yt), processing time to calculate is necessary. Accordingly, by the following method, these can be obtained in a short time by detecting and presuming.

Initially, the detection and presumption of the size of the document D will be described below. The size of the document D may be detected by a size detection means, not shown in the drawing. That is, the width of the document (the direction perpendicular to the conveyance direction) is detected when the document is placed on the document stacking table 11, and further, the length of the document D (the conveyance direction) is detected while being conveyed by the conveying means. The size of the document may be detected by a method to detect the size of the document from the detected width and length, as described above, or by a non-contact type size detection means, not shown, when the document D is placed on the platen 17.

Next, the presumption of the top (xt, yt) of the document area after the inclination correction, will be described. When the size of the document D is known, the top (xt, yt) of the document area after the inclination correction can be obtained. That is, the top (xt, yt) of the document area after the inclination correction is positioned a/2 below from the center of the platen 17 (a one-dotted chain line shown by FIG. 4(*a*)). In the above description, the symbol a is the width in the primary scanning direction on the document D, and in the case of A4R sized document, a is 210 mm, (incidentally, the length b mm of the size A4R in the secondary scanning direction is 279 mm). Accordingly, the top of the document area is positioned 105 mm below from the center of the platen 17. In the following description, the top of the document area after the inclination correction is defined as the origin ((xt, yt)=(0, 0)).

Incidentally, when the present example is applied to a copier, information of "copy size" which is the size of a transfer sheet set from an operation panel or the like, not shown, is presumed as the size of the document D, and further, in the following calculation, including the top (xt, yt) of the document area after the inclination correction, the copy size may be used as the size of the document D. In the case of a copier, because a copy size which coincides with the document D is used (so-called a life-size), or image information of the document D is magnification change processed to meet the copy size (which may be magnification changed simultaneously with the above-described secondary scanning magnification change processing or primary scanning magnification change processing), it is better to use the copy size.

Next, the presumption of the document reference point (xs, ys) will be described. The presumption of the document reference point is conducted according to the size and inclination angle θ of the document D. In order to obtain the document reference point, initially, the length L from the central point (an intersection of the diagonal) of the document D and the angle φ are obtained. The letter L is a half length of the diagonal, and is expressed as follows:

$$L = \frac{1}{2} \times (a^2 + b^2)^{1/2}$$

The angle φ to the central line (refer to FIG. 4(a)) is $$\phi = \text{Tan}^{-1}(a/b)$$

Incidentally, because L or φ is a value depending on only the size of the document D, L or φ previously calculated for each sheet size is stored in a memory, and it may be allowed that L or φ is directly read from the memory corresponding to the size of the document D.

When L or φ is obtained, the document reference position (xs, ys) can be obtained by the following equation.

$$xs=0, \; ys=a/2-L\sin(\phi-\theta)\times\cos\theta$$

Herein, a reason why the right side of ys is multiplied by cos θ, is that the image data is subjected to magnification change processing by the primary scanning magnification change processing means 26 (corresponding to the inclination angle θ of the document D) as described above.

As described above, by obtaining the size of the document D, the document reference point (xs, ys), and the top (xt, yt) of the document area after the inclination correction, by detection and presumption, image data can be detected before it is stored in the image memory 28, and not only data shift processing, which will be described later, can be conducted at once, but also, in the case where the lengthwise correction (correction in the primary scanning direction) in the data shift processing is conducted first, when the image data is stored in the image memory 28, the lengthwise correction in the data shift processing can be simultaneously conducted (that is, before the document D is read by the image reading means 21, because the document reference position and the top of the document area after the inclination correction are previously known, the image data can be stored in the image memory 28 during the lengthwise correction), and thereby, the efficiency can be further increased.

Next, data shift processing will be described. The data shift processing is processing to correct the image read by the image reading means 21 according to the inclination angle θ of the document stored in the inclination angle memory 24. This processing is conducted by shifting the image data stored in the image memory 28 by an inclination correction means 29, which is a correction means. That is, the inclination correction means 29 is a means to correct the inclination by data shifting the image data on the image memory 28, and amounts of movement, (respectively I, J), in which each pixel is moved in the lengthwise direction (the primary scanning direction) and in the widthwise direction (the secondary scanning direction), corresponding to the inclination angle θ stored in the inclination angle memory 24), are obtained. By moving each pixel according to the amount of movement, the inclination correction of the image is conducted. Hereinafter, it will be detailed. In this connection, in the description below, the case in which the widthwise correction is carried out after the lengthwise correction, will be described, however, the reverse may be allowed.

Figure 5:
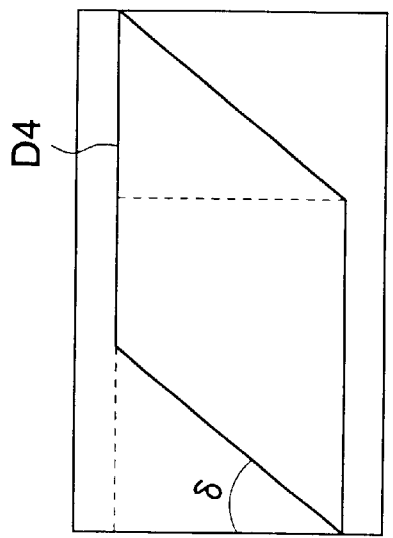
FIGS. 5(a), 5(b), 5(c) and 5(d) are views typically showing a vertical correction respectively.
Figure 5:
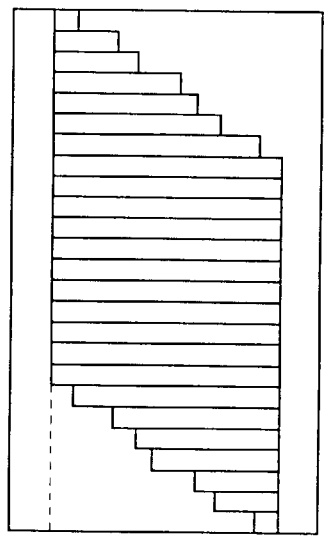
Figure 5:
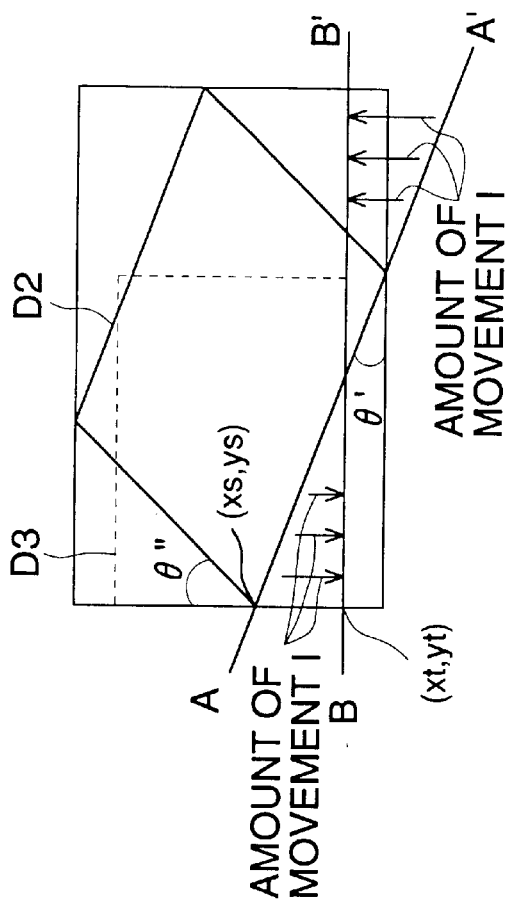
Figure 5:
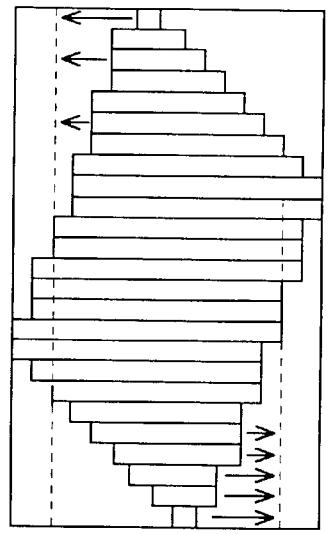

Initially, the lengthwise correction will be described below referring to FIGS. 5(a), 5(b), 5(c) and 5(b), in which the lengthwise correction is typically shown. FIG. 5(a) is a view typically showing image data (the document D2) before the lengthwise correction. FIG. 5(b) is a view typically showing image data (the document D4) after the lengthwise correction. FIGS. 5(c) and 5(d) are image-like views showing the data shift of the lengthwise correction.

In FIG. 5(a), the image data is shifted in lengthwise (primary scanning) direction so that a straight line AA' which is in parallel to one side of the document and includes the document reference point (xs, ys), coincides with a straight line BB' which is in parallel to the secondary scanning direction (x direction) and includes "a top of the document area after the inclination correction", that is, the origin. At this time, it is necessary that the image data is not shifted in the widthwise (secondary scanning) direction. When an arbitrary point in the image data is (x, y), an amount I of shift(movement) in the lengthwise direction can be expressed as follows:

$$I = ys - X \cdot \tan\theta'$$

In FIGS. 5(a) to 5(d), the image data is moved downward if I<0, and upward if I>0. In this connection, θ' is a function of θ, as described above.

Accordingly, the amount of movement I is a function of x, and does not depend on y, and therefore, data having equal y has the equal amount of movement I. As shown in FIG. 5(c), common pixels in the primary scanning direction (pixels partitioned by x) of the image data (the document D2) before the lengthwise correction, are collected, and may only be shifted on the image memory 28 according to the amount I of the movement so as to match FIG. 5(d). That is, pixels may only be moved in the primary scanning (y, lengthwise) direction, and a plurality of pixels can be collectively moved, so that the amount I of the movement can be calculated for each group of pixels partitioned by x, and corrected.

Then, the image data of the document D3 after the lengthwise correction becomes as shown in FIG. 5(b). Incidentally, δ formed between the slanting side in the image data after lengthwise correction and the primary scanning direction (refer to FIG. 5(b)) is expressed by a function of θ as follows.

$$\delta = \text{Tan}^{-1}(1/(1/\tan\theta'' + \tan\theta'))$$
$$= \text{Tan}^{-1}(1/(\cos^2\theta(1/\tan\theta + \tan\theta)))$$

Next, the widthwise correction will be explained below, referring to FIGS. 6(a), 6(b), 6(c), and 6(d) which are views typically showing the widthwise correction. FIG. 6(a) is a view typically showing the image data (document D4) before the widthwise correction (after the lengthwise correction). FIG. 6(b) is a view typically showing the image data (document D3) after the widthwise correction (after the lengthwise correction). FIGS. 8(c) and 6(d) are image-like views showing the data shift of the widthwise correction.

In FIG. 6(a), the image data is shifted (moved) in the x direction (which is the secondary scanning direction, and is also called the widthwise direction) so that the slanting line becomes vertical. At the time, it is necessary that the image data is not shifted (moved) in the lengthwise (primary scanning) direction. When an arbitrary point in the image data is defined as (x, y), the amount J of the shift (movement) in the widthwise direction, is expressed as follows:

$$J = -y \cdot \tan\delta$$

In FIG. 6, when J<0, the image data is moved in the left direction, and when J>0, it is moved in the right direction.

Accordingly, the amount of movement J is a function of y, and does not depend on x, and therefore, data having equal x has the equal amount of movement J. As shown in FIG. 6(c), common pixels in the secondary scanning direction (pixels partitioned by y) of the image data before the widthwise correction, are collected, and may only be shifted on the image memory 28 according to the amount J of the movement so as to become as shown in FIG. 6(d). That is, pixels may only be moved in the secondary scanning (x, widthwise) direction, and a plurality of pixels can be collectively moved, so that the amount J of the movement can be calculated for each group of pixels partitioned by y, and corrected.

As described above, the inclination correction of the image data can be conducted by data shift processing in which the image data of the document D stored in the image memory 28 is shifted by the inclination correction means 29 according to the inclination angle θ stored in the inclination angle memory 24. That is, the inclination correction can be conducted by moving (shifting) pixels, which are collected for each y (primary scanning, lengthwise) or for each x (secondary scanning, widthwise) by the lengthwise correction or the widthwise correction, on the memory. Accordingly, the total amount of calculation for the amounts of movement I, J, can be reduced Concretely, if the image data consists of x×y pixels, the number of times of movement amount calculation may be only x+y times, and the number of times of calculation is reduced, comparing to that of the movement amount calculation of x×y times of affine transformation. Thereby, the complicated calculation is not necessary, so that time necessary for the inclination angle correction can be reduced. Further, the large memory capacity is not necessary, resulting in a cost reduction.

Incidentally, the inclination angle θ of the document D varies depending on various conditions such as the quality of sheet of the document D, environmental condition or condition of the conveying means, however, the document D placed on the document stacking table 11 has the same quality of sheet, and the almost same environmental condition and condition of the conveying means, and therefore, one sheet of the document D shows the same inclination angle θ as that of the other document D. That is, the inclination angle θ of a set of the documents D placed on the document stacking table 11 has the reproducibility with that of the document D (a sheet of a set of documents) conveyed by the conveying means. Accordingly, it is not necessary to detect the inclination angle θ by the inclination angle detecting means 22 at every time when the document D is conveyed by the conveying means. In other words, an image read by the image reading means 21 can be corrected according to the inclination angle θ of the document D already stored in the inclination angle memory 24, without detecting the inclination angle of the document D by the inclination angle detecting means 22. Accordingly, it is not necessary to detect the inclination angle θ at every time when each of a plurality of documents is conveyed, therefore, time necessary for detecting the inclination angle θ of the document D can be shortened, and the image reading efficiency can be increased.

For example, for the first document, the inclination angle θ is detected, the detected inclination angle θ is stored in the inclination angle memory 24, and the inclination is corrected, and for the other documents D (the second and subsequent documents) placed on the document stacking table 11, the inclination angle θ is not detected, and the inclination may also be corrected according to the inclination angle 8, stored in the inclination angle memory 24. Alternatively, the inclination angle θ may also be detected for every n sheets of the document D conveyed by the conveying means (herein, n is an arbitrary integer, and may also be set by the operator from an operation panel or the like, not shown). Further, in the case of the document D with high frequency in use, the inclination angle θ is previously set from the operation panel or the like, not shown, and is stored in the inclination angle memory 24, and according to the inclination angle θ stored in the inclination angle memory 24, the inclination of the image read by the image reading means 21 may also be corrected.

In the above structure, pre-scanning is not necessary to detect the inclination angle of the document, and therefore, time necessary for detecting the inclination angle of the document can be shortened, and the image reading efficiency can be increased.

Further, the inclination angle detection is not necessary at every time when each of a plurality of documents is conveyed, and therefore, time necessary for detecting the inclination angle of the document can be shortened, and the image reading efficiency can be increased.

Still further, pre-scanning is not necessary to detect the inclination angle of the document, and therefore, time necessary for detecting the inclination angle of the document can be shortened, and the image reading efficiency can be increased.

Yet further, the inclination angle of the document can be detected by a simple structure, and therefore, not only cost reduction, but also an increase of the efficiency of the inclination angle detection can be intended.

Furthermore, the inclination angle of the document can be more accurately detected.

Further, the inclination angle can be corrected by a simple method of the data shift, without any complicated calculation, and therefore, time necessary for the inclination angle correction can be shortened, and a large memory capacity is not used, so that cost reduction can be intended.

Furthermore, the magnification change processing in the relative movement direction is conducted without calculation, and therefore, more time shortening and cost reduction can be intended.

Next, another example of the present invention will be described referring to drawings.

The Structure of a Document Inclination Angle Correction Device

Figure 7:
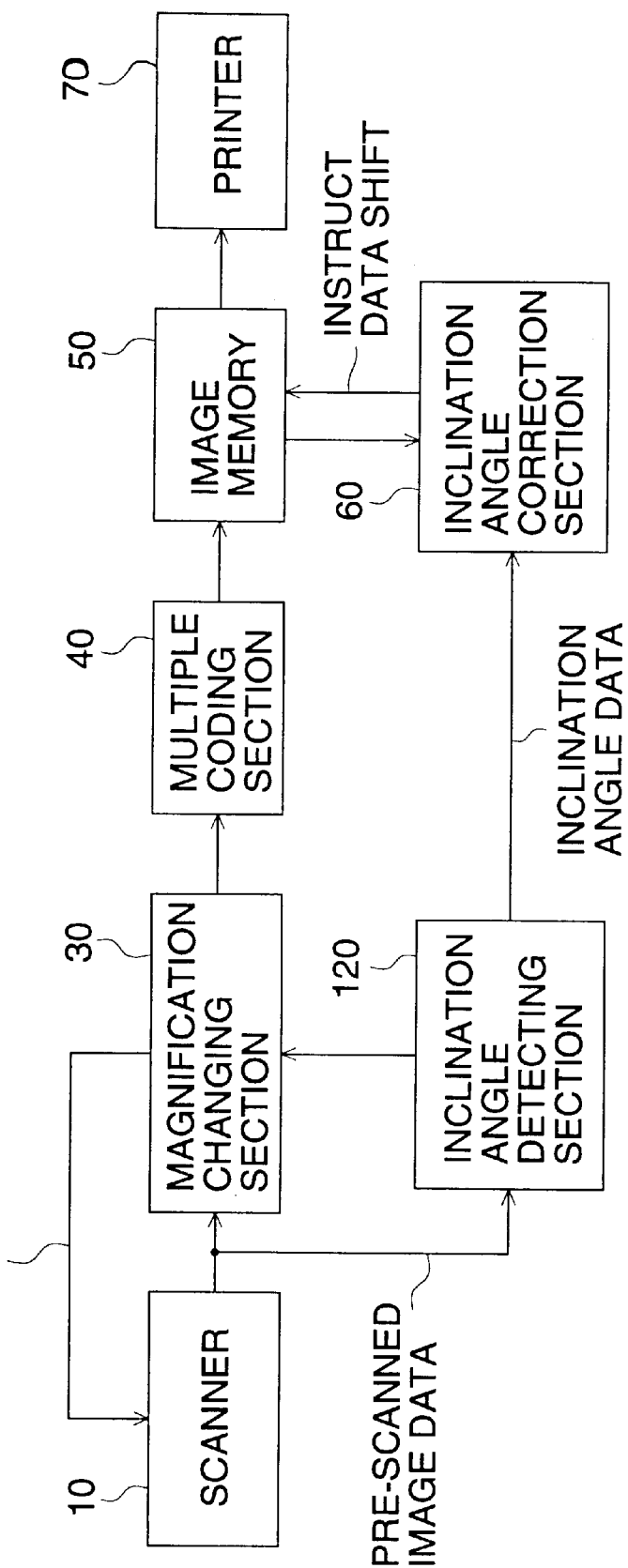
FIG. 7 is a structural view showing the entire structure of a document angle correction device used in another example of the present invention.

FIG. 7 is a structural drawing showing a document inclination angle correction device in each example of the present invention, or an example of a device for conducting a document inclination angle correction method of each example of the present invention.

In FIG. 7, a scanner 10 constitutes an image reading means for reading the document image, and generates image data. An inclination angle detecting section 120 constitutes an inclination angle detecting means to extract information of a document edge included in image data, and to detect an inclination angle of the document from the information of the document edge, and detects the document edge information and the inclination angle, referring to signal change timing of image data.

A magnification changing section 30 conducts the primary scanning direction magnification change and the secondary scanning direction magnification change to eliminate the change of a document size generated by data shift processing, which will be described later, and constitutes a portion of the inclination angle correction means.

A multiple coding section 40 is a conversion means to convert magnification change processed image data into multiple coding data according to the processing gradation in an image memory. The image memory 50 is an operation area in the case where the data shift processing is conducted corresponding to the inclination angle, and the data shift processing of the image data is conducted by an inclination angle correction section 60 structured by a portion of the inclination angle correction means.

A printer 70 is an output means to print the image data of the document whose inclination angle is corrected.

The Operation of the Document Inclination Angle Correction Device, and the Sequence of the Document Inclination Angle Correction Method Herein, referring to a flow chart in FIG. 8 and illustrations in FIG. 9(*a*) and subsequent drawings, the operation of the document inclination angle correction device, and the processing sequence of the document inclination angle correction method, will be described.

In this connection, because in the present invention, the magnification change processing and the data shift processing are conducted, it is also considered that the magnification change processing is conducted after the data shift processing has been conducted, however, in the present example, a method will be explained in which the data shift processing is conducted after the magnification change processing. As described above, the method in which the data shift processing is conducted after the magnification change processing, is appropriate for a device in which the magnification change processing in the secondary scanning direction is conducted in the scanner 10.

The Inclination Angle Detection

Figure 8:
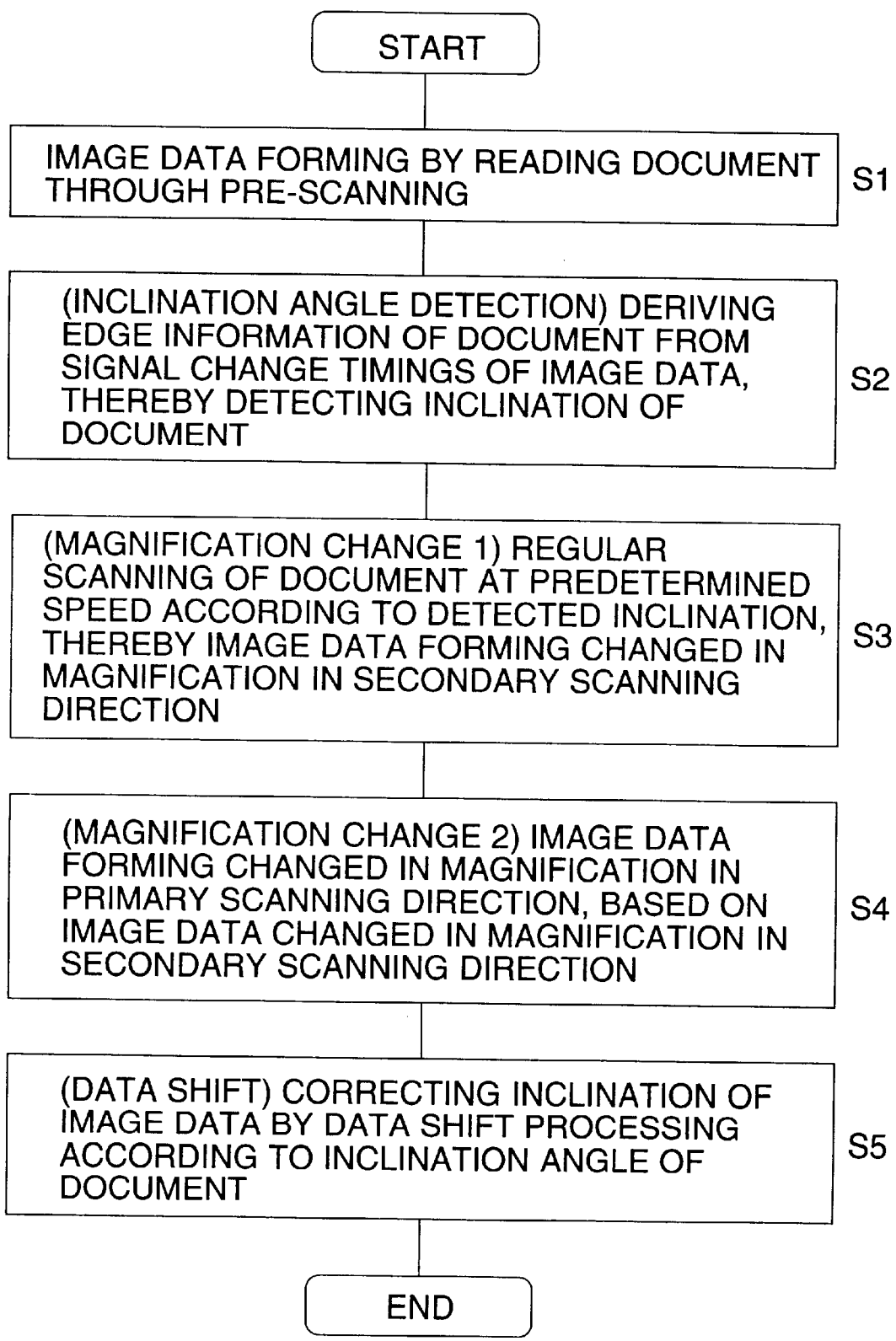
FIG. 8 is a flow chart showing a condition of the document angle correction of the example of the present invention.

Initially, the scanner 10 conducts pre-scanning, and generates image data (the step S1 in FIG. 8). In this case, because it is necessary to extract the document edge as will be described later, a platen cover of the scanner 10 (the surface which is read in the surroundings of the document) needs to have the density and reflectance, different from those of the background of the document.

In this connection, the density and reflectance, different from those of the background of the document, corresponds to a color darker than the background of the document, or reversely, a color having higher reflectance than that of the background of the document (a fluorescent color or metallic gloss). The surface having such density and reflectance may be the entire surface of the platen cover, or a partial range which can entirely cover the surroundings of the inclined document.

Regarding thus obtained image data, generated by reading also the platen cover, the inclination angle detecting means 120 extracts document edge information included in the image data, and the inclination angle of the document is detected from the document edge information (the step S 2 in FIG. 8).

Herein, the X axis direction (the arrangement direction of the image reading sensors) is defined as the primary scanning direction, and Y axis direction (the movement direction of the sensor when reading, or the document feeding direction) is defined as the secondary scanning direction, and the inclination angle detection will be explained.

Figure 9:
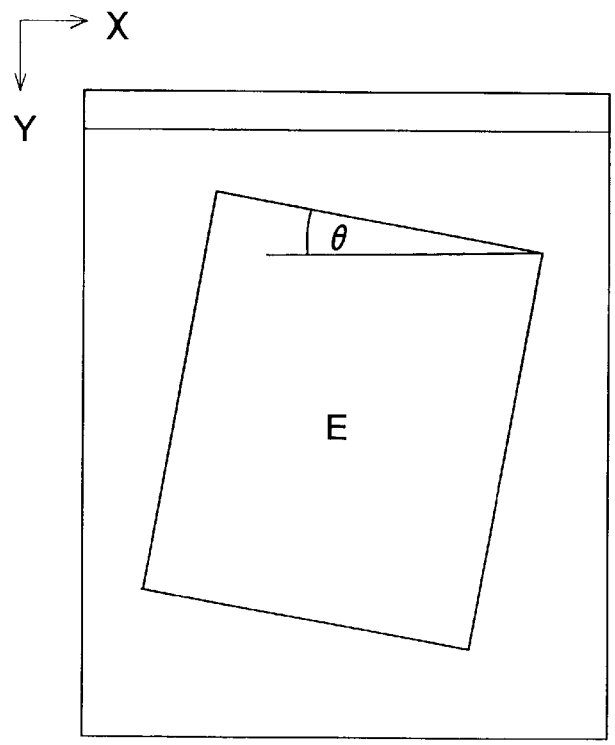
FIGS. 9(a) and 9(b) are illustrations explaining a condition, in which a document edge is detected by signal change timing of a light receiving signal, in the example of the present invention.
Figure 9:
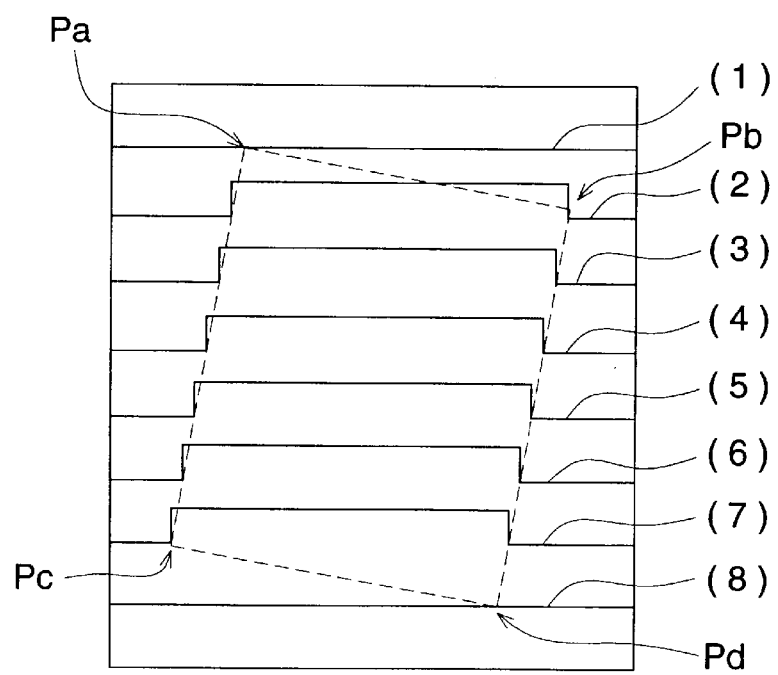

FIG. 9(*a*) is a view typically showing the document E and the platen cover, viewed from the sensor-side, and shows the state in which the platen cover having the low reflectance (high density) and the document inclined at an angle θ are arranged.

When thus arranged document is read by the scanner 10, a light receiving signal is as shown by (1) to (8) in FIG. 9(*b*). Herein, in order to simplify the explanation, 8 profiles of the light receiving signals of (1) to (8) are shown.

That is, when a profile of a certain line is observed, the profile shows the uniform, low brightness at the outside of the document area (the surface of the platen cover), and shows the rising to the high brightness at the document edge. Then, the almost uniform brightness is continued, and the falling to the low brightness is shown at the document edge on the opposite side. Then, the low brightness is continued to the edge of the platen cover. In this connection, in the area on which no document exists, the low brightness continues.

When such the image data is successively observed in the Y direction, after the rising is generated at Pa, it reaches Pc while a value of X is gradually reduced, and after that, the value of X is suddenly increased and it disappears after it reaches Pd.

When such the image data is successively observed in the Y direction, after the falling is generated at Pa, it reaches Pb while a value of X is suddenly increased, and after that, the value of X is gradually decreased and it disappears after it reaches Pd.

In the manner as described above, by observing the timing of the rising and the falling, the position of Pa, Pb, Pc, and Pd, which are the four corners of the document, can be obtained. In this connection, in the manner described above, when the rising and the falling are found, these can be easily detected by obtaining the difference between data before 1 to 5 lines, and that of the target line.

That is, initially, the inclination angle detecting section 120 obtains position data of the four corners and stores the data as information of the document edge. Incidentally, in the position data, Pa=(xa, ya), Pb=(xb, yb), Pc=(xc, yc), and Pd=(xd, yd) are defined.

The inclination angle detecting section 120 obtains the inclination angle θ of the document from the above-described position data by the following equation:

$$\theta = \tan^{-1}\{(yb-ya)/(xb-xa)\}$$

or $$\theta = \tan^{-1}\{(yd-yc)/(xd-xc)\}$$

Incidentally, in the above case, the position Pa of the corner of the document, closest to the origin (x=0, y=0), is defined as the document reference point.

Magnification Change Processing

In the present example, initially, the inclination of the Y axis is corrected, and next, the inclination of X axis is corrected by data shift processing, which will be described later. Therefore, the magnitude is multiplied by cos θ on Y axis (the secondary scanning direction), and the magnitude is multiplied by 1/cos θ on X axis (the primary scanning direction). Accordingly, in order to eliminate the change of the document size caused by such the data shift processing, magnification change in the primary scanning direction and the magnification change in the secondary scanning direction are conducted.

However, when the inclination angle is small, the change of the document size caused by the data shift processing, which will be described later, is slight. Accordingly, when the change of the document size is in a degree of the magnitude which is out of the problem, the magnification change processing can be omitted.

Initially, for the inclination angle θ of the document obtained as described above, the magnification change processing of 1/cos θ times in the secondary scanning direction is conducted.

That is, in the scanner 10 which can conduct the magnification change in the secondary scanning direction by the image reading speed, the regular scanning is conducted by changing the scanning speed into 1/cos θ times of the normal speed, referring to the magnification change data in the secondary scanning direction from the magnification change processing section 30, thereby, image reading and the magnification change in the secondary scanning direction are conducted, and image data is generated (the step S3 in FIG. 8).n FIG. 8).

For the image data on which the magnification change in the secondary scanning direction is conducted in the manner described above, the magnification processing is conducted so that the magnitude in the primary scanning direction is multiplied by cos θ. That is, by conducting the linear interpolation in the magnification change processing section 30, the magnification change in the primary scanning direction is conducted and the image data is generated (the step S4 in FIG. 8).

For the image data on which the magnification change processing in the primary scanning direction and the secondary scanning direction in this manner, multiple coding processing such as the error diffusion method or dither method, by which the image size can be compressed, is conducted in the multiple coding section 40. The multiple coded image data is stored in the image memory 50.

Figure 10:
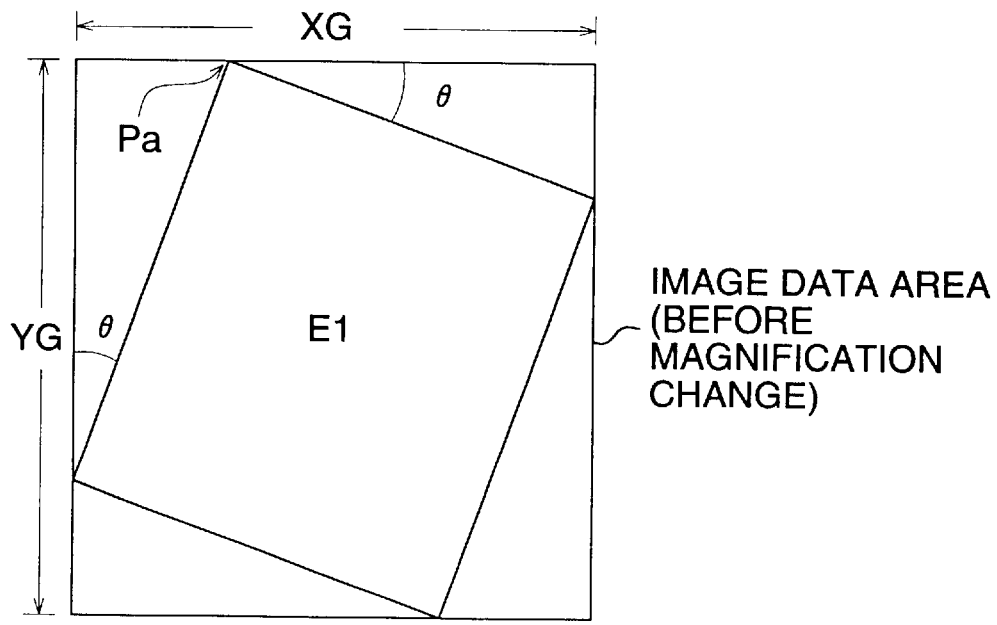
FIGS. 10(a) and 10(b) are illustrations explaining a condition of magnification change processing in the example of the present invention.
Figure 10:
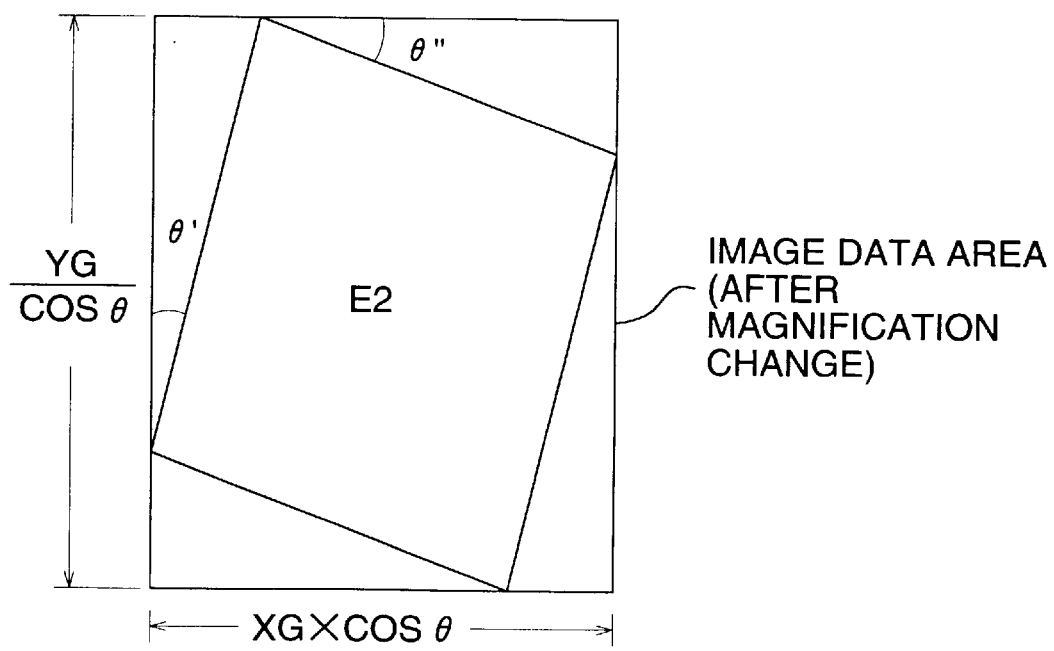

The image data, magnification change processed as described above, is respectively magnification change processed in the primary scanning direction and secondary scanning direction, therefore, a rectangular E1 (FIG. 10(*a*)) before the magnification change, is changed into a parallelogram $E_2$ (FIG. 10(*b*)) after the magnification change.

Herein, when an angle formed between Y axis and the magnification changed document is θ', and an angle formed between X axis and the magnification changed document is θ" as shown in FIG. 10(*b*), the following relationship can be obtained:

$$\theta'=\tan^{-1}(\tan\theta\cdot\cos^2\theta)$$

$$\theta''=\tan^{-1}(\tan\theta/\cos^2\theta)$$

Data shift Processing

In the data shift processing, initially, the inclination of Y axis is corrected (shift processing in X direction), and next, the inclination of X axis is corrected (shift processing in Y direction) (the step S5 in FIG. 8).

Figure 11:
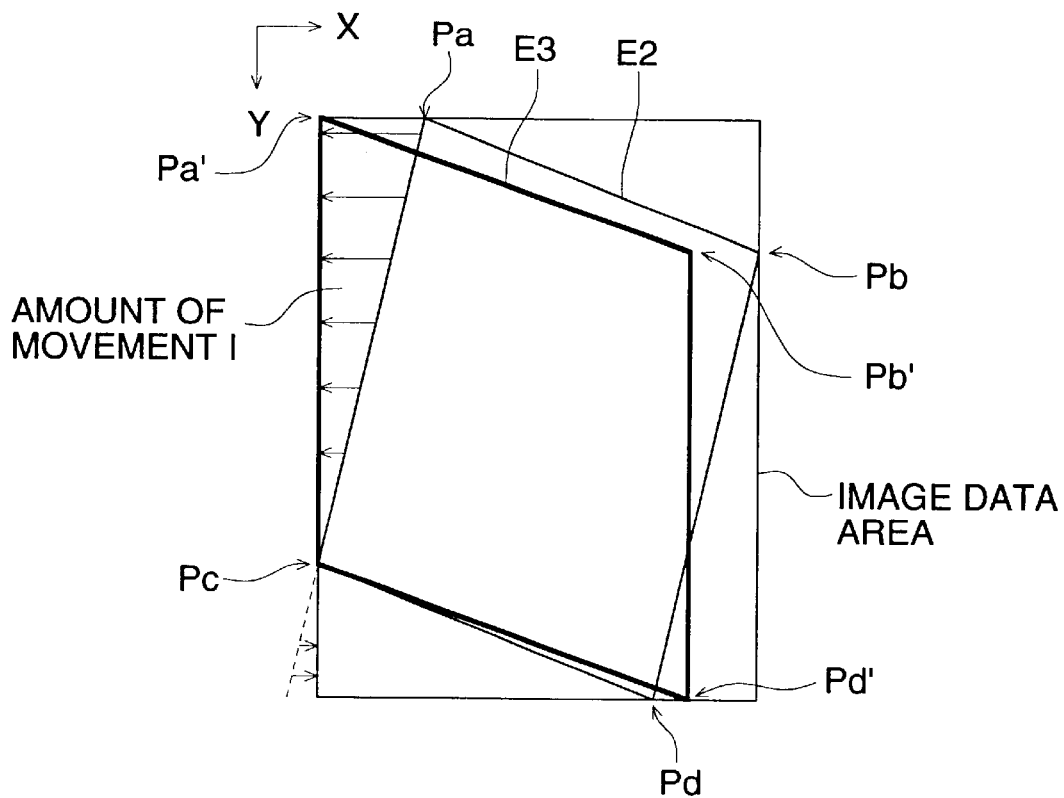
FIGS. 11(a) and 11(b) are illustrations explaining a condition of data shift processing in the example of the present invention.
Figure 11:
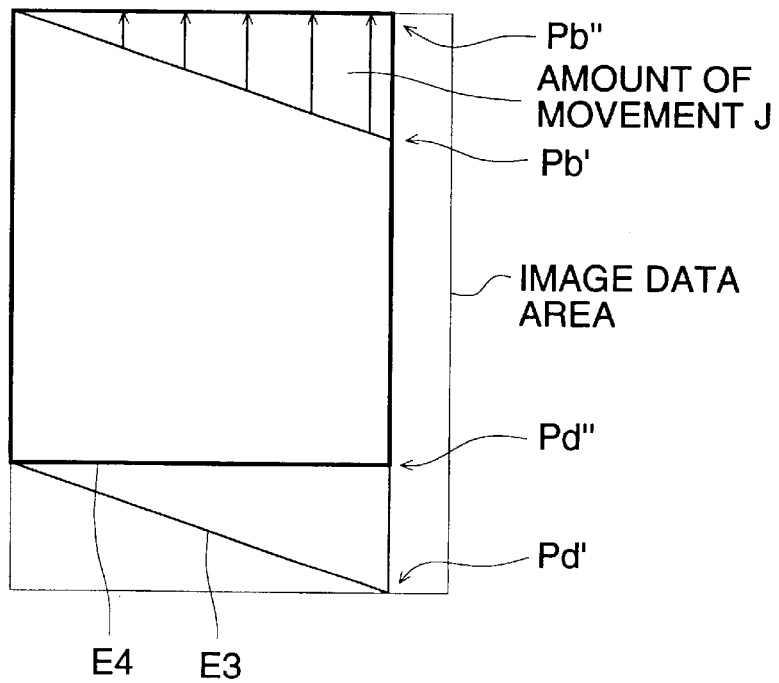

That is, for the document image data E 2 before data shift processing in FIG. 11(*a*), the content of each pixel of the document image data is shifted in the direction parallel to X axis so that Pa–Pc coincides with Y axis. At the data shift processing, the content of each pixel of the document image data is not shifted in the Y direction.

In this case, the point Pc in contact with Y axis (or closest to Y axis) is defined as the document reference point (X, Y), and the image data is shifted by the amount I corresponding to the inclination to Y axis.

Herein, the amount of movement I of an arbitrary point (x, y) in the document image data is obtained by the following equation, when the starting point of the image data area is defined as (x0, y0):

$$I=(y-Y)\cdot\tan\theta'-(X-x0)$$

Herein, Y=y0=0, x0=0, and thereby the amount I can be expressed by the following equation:

$$I=y\cdot\tan\theta'-X$$

Figure 12:
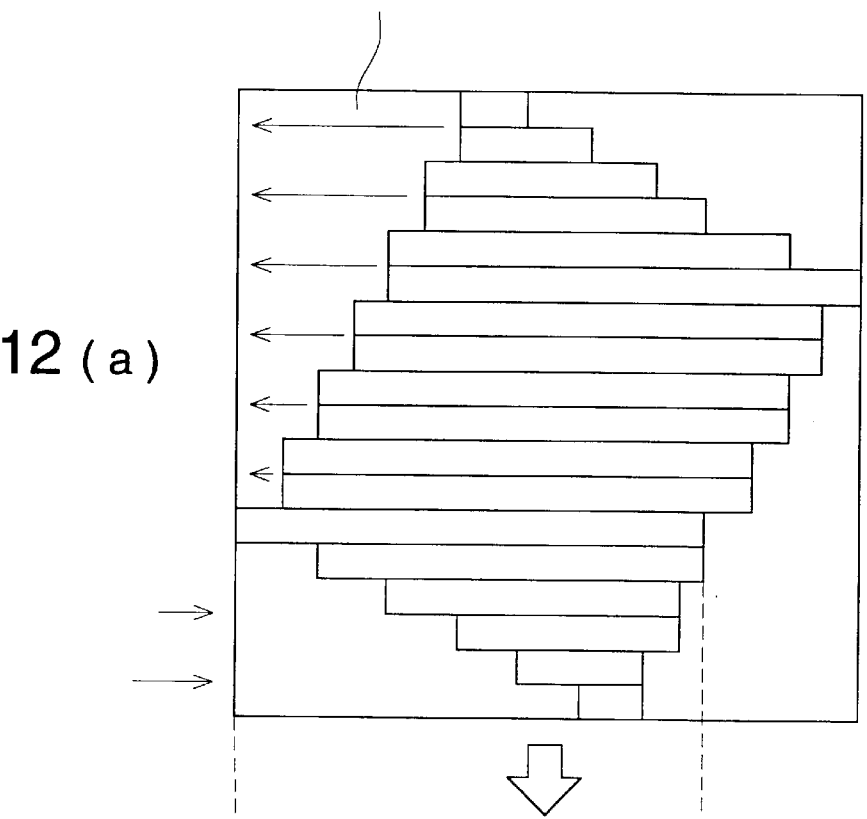
FIGS. 12(a) and 12(b) are illustrations showing data movement in the data shift processing in the example of the present invention.
Figure 12:
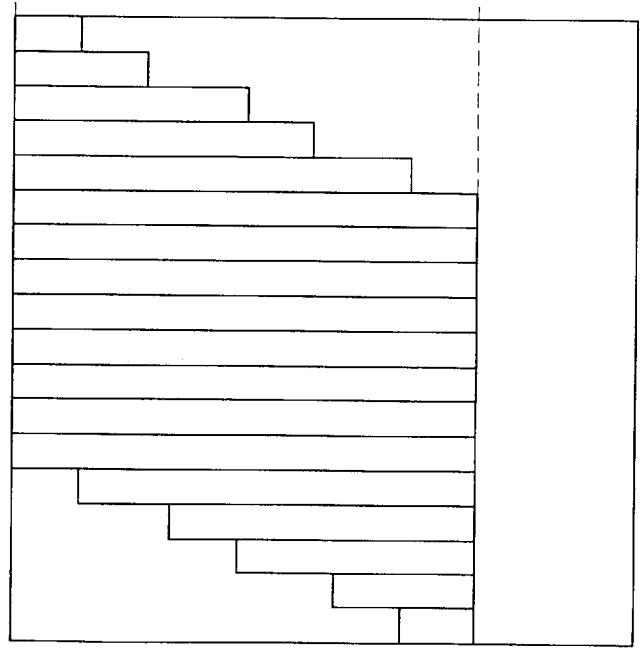

Accordingly, data having the same position in the direction of Y axis has the same amount of movement. Therefore, common pixels in the document image data E2 before data shift processing, are collected together in the direction of X axis perpendicular to Y axis as shown in FIG. 12(*a*), and shifted according to the amount of movement I, so that FIG. 12(*b*) can be obtained.

This processing is only the movement in the direction of X axis, and a plurality of pixels can be collected together and processed. Accordingly, it is not necessary to calculate for each pixel as in the conventional affine transformation, and the data shift processing in the present example can be quickly carried out.

By the shift processing in the direction of X as described above, the document image data E 2 becomes Pa'–Pc–Pb'–Pd' (E3) as shown by the bold solid line in FIG. 11(*a*). In this case, when an angle ∠ PaPa'Pb' is defined as δ, $$\delta=\tan^{-1}(1/(1/\tan\theta''+\tan\theta'))=\tan^{-1}(\cos^2\theta(1/\tan\theta+\tan\theta))$$

δ can be expressed by the function of θ.

In this case, the point Pa' in contact with X axis (or closest to X axis) is defined as the document reference point (X, Y), and the image data is shifted by the amount J corresponding to the inclination to X axis.

Herein, the amount of movement J of an arbitrary point (x, y) in the document image data is obtained by the following equation, when the starting point of the image data area is defined as (x0, y0):

$$J=(x-X)\cdot\tan\delta-(Y-y0)$$

Herein, when J<0, it is moved upward in FIG. 11(*b*), and when J>0, it is moved downward in FIG. 11(*b*).

Herein, because X=xo=0, Y=y0=0, the amount J can be expressed by the following equation:

$$J=-x\cdot\tan\delta$$

Accordingly, data having the same position in the direction of X axis has the same amount of movement. Therefore, common pixels in the document image data E 3 before data shift processing, are collected together in the direction of Y axis perpendicular to X axis as shown in FIG. 13(*a*), and shifted according to the amount of movement J, so that FIG. 13(*b*) can be obtained, that is, E4 which is the document image data shown in FIG. 11(*b*) can be obtained.

This processing is only the movement in the direction of Y axis, and a plurality of pixels can be collected together and processed. Accordingly, it is not necessary to calculate for each pixel as in the conventional affine transformation, and the data shift processing in the present example can be quickly carried out.

By using the data shift processing as described above, image data in the image memory 50 is corrected by the inclination angle correction section 60 so that inclination of the document is eliminated. Then, the image data whose inclination is corrected, is sent to the printer 70, and an image having no inclination is formed on the transfer sheet.
(Other examples)

In the examples described above, the inclination to the axis in the primary scanning direction is corrected after the inclination to the axis in the secondary scanning direction is corrected, however, the reverse may be possible. In such the case, an aspect of deformation of the image data is reversed in the length and width, therefore, the magnification change processing needs to be conducted so that the length and width are reversed to those in the above example.

Further, in the example described above, the data shift processing is conducted after the magnification change processing, however this order may be reversed. In this connection, when the magnification change processing is conducted later, it is conducted on the image memory 50.

As detailed above, the following effects can be obtained according to the present invention.

In the above structure when the document is placed on the image reading position, the document edge information included in the read image data is extracted, and the inclination of the document is detected from the document edge information. Accordingly, the inclination of a row of characters included in the image data need not be detected, and the complicated calculation or the large capacity of memory is not necessary. Even if an inclined row of characters exists in the document, there is no erroneous movement.

Further, by conducting the data shift processing corresponding to the inclination angle of the document, the inclination of the document is corrected. In the inclination correction, data is shifted in the lengthwise direction and the widthwise direction corresponding to the inclination angle, and the inclination is eliminated.

Accordingly, it is not necessary to conduct the affine transformation which conducts the matrix calculation using the trigonometric function, and further, it is not necessary to hold both image data before and after the processing. Therefore, a very large amount of calculation is not necessary and a complicated calculation device in which a large capacity of memory is accommodated, is not necessary. Thereby, a document inclination angle correction method in which a complicated calculation or device is not necessary, and by which the inclination angle can be easily detected and corrected, can be realized.

What is claimed is:

1. A correction method of a document inclination angle in a copier comprising:
   (a) first detecting an edge of a document;
   (b) second detecting an inclination amount of the document corresponding to an inclination angle according to a detected result of the edge of the document, wherein the inclination angle represents an inclination angle of the edge of the document with respect to a first reference direction and a second reference direction perpendicular to the first reference direction;
   (c) magnifying or reducing image data of the document in the first and second reference directions according to the inclination amount, wherein the magnifying or reducing image data of the document in the second reference direction is conducted by changing a relative moving speed between the document and a document reading means;
   (d) first shift processing in which the image data are shifted to one of the first and second reference directions according to the inclination amount, wherein the first shift processing includes shifting simultaneously the image data corresponding to a plurality of pixels; and
   (e) second shift processing in which the image data are shifted to the other of the first and second reference directions according to the inclination amount, wherein the second shift processing includes shifting simultaneously the image data corresponding to a plurality of pixels.

2. The correction method of claim 1, wherein the first shift processing includes shifting simultaneously the image data corresponding to the plurality of pixels adjacent to each other in the first reference direction.

3. The correction method of claim 1, wherein the second shift processing includes shifting simultaneously the image data corresponding to the plurality of pixels adjacent to each other in the second reference direction.

4. The correction method of claim 1, wherein the first detecting includes:
   generating the image data by reading the document in a document reading position; and
   detecting the edge of the document on the basis of the generated image data.

5. The correction method of claim 4, wherein the first detecting is carried out by a signal change timing of the image data.

6. The correction method of claim 1, wherein in the first detecting, the edge of the document is detected by a plurality of sensors on the way of conveyance thereof by document conveying device to a reading position.

7. The correction method of claim 6, wherein the plurality of sensors are arranged in a direction perpendicular to a document conveyance direction, and the second detecting the inclination amount is conducted on the basis of a document conveyance speed a document conveying device and a result of detecting the document by a plurality of sensors.

8. The correction method of claim 7, wherein the document conveyance speed is a preset speed.

9. The correction method of claim 7, wherein the plurality of sensors include a sensor arranged with a predetermined distance in the document conveyance direction, and the document conveyance speed can be obtained by a combination of a period of time during which the document passes the plurality of sensors and the predetermined distance.

10. The correction method of claim 1 further comprising storing the inclination amount.

11. The correction method of claim 10, wherein the inclination amount is used for second and succeeding documents of a plurality of documents which are conveyed one by one to a document reading position by document conveying device, and the first and second detecting are omitted.

12. The correction method of claim 11, wherein in the first detecting, the edge of a first document of the plurality of documents is detected by plurality of sensors on the way of conveyance thereof by document conveying device to a reading position.

13. The correction method of claim 1 further comprising multiple coding in which the magnifying or reducing image data is multiple coded, wherein image data multiple coded in multiple coding is shifted in first shift processing.

14. A correction method of a document inclination angle in a copier comprising:
   (a) first detecting an edge of the document;
   (b) second detecting an inclination amount of the document corresponding to an inclination angle according to a detected result of the edge of the document, wherein the inclination angle represents an inclination angle of the edge of the document with respect to a first reference direction and a second reference direction perpendicular to the first reference direction;
   (c) magnifying or reducing image data of the document in the first and second reference directions according to the inclination amount, wherein the image data to be magnified or reduced in the second reference direction is conducted by changing a relative moving speed between the document and a document reading means;

(d) multiple coding of the magnified or reduced data to produce multiple coded data;

(e) first shift processing in which the multiple coded data are shifted to one of the first and second reference directions according to the inclination amount, wherein the first shift processing includes shifting simultaneously the multiple coded data corresponding to a plurality of pixels; and (f) second shift processing in which the multiple coded data are shifted to the other of the first and second directions according to the inclination amount, wherein the second shift processing includes shifting simultaneously the multiple coded data corresponding to a plurality of pixels.

15. The correction method of claim 14, wherein the first shift processing includes shifting simultaneously the multiple coded data corresponding to the plurality of pixels adjacent to each other in the first reference direction.

16. The correction method of claim 14, wherein the second shift processing includes shifting simultaneously the multiple coded data corresponding to the plurality of pixels adjacent to each other in the second reference direction.

* * * * *